US012645782B2

(12) United States Patent
Ramamurthy

(10) Patent No.: US 12,645,782 B2
(45) Date of Patent: Jun. 2, 2026

(54) CAPTCHA AUTHENTICATION USING SMART WATCH SCRIBBLE

(71) Applicant: Visa International Service Association, San Francisco, CA (US)

(72) Inventor: Rakesh Ramamurthy, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 213 days.

(21) Appl. No.: 18/419,667

(22) Filed: Jan. 23, 2024

(65) Prior Publication Data

US 2025/0238497 A1     Jul. 24, 2025

(51) Int. Cl.
*G06F 21/36*          (2013.01)

(52) U.S. Cl.
CPC ...... *G06F 21/36* (2013.01); *G06F 2221/2133* (2013.01)

(58) Field of Classification Search
CPC .......................... G06F 21/36; G06F 2221/2133

USPC ........................................................ 726/18
See application file for complete search history.

(56) References Cited

U.S. PATENT DOCUMENTS

| | | | |
|---|---|---|---|
| 9,985,943 B1 * | 5/2018 | Reading | H04L 63/08 |
| 2015/0026572 A1 * | 1/2015 | Cahill | G06F 3/0488 |
| | | | 715/716 |
| 2016/0300054 A1 * | 10/2016 | Turgeman | G06F 21/36 |

FOREIGN PATENT DOCUMENTS

WO      WO-2015032281 A1 *   3/2015   ............. G06F 21/31

* cited by examiner

*Primary Examiner* — Jacob Lipman
(74) *Attorney, Agent, or Firm* — K&L Gates LLP

(57)          ABSTRACT

A system and method for authenticating a user device with a CAPTCHA (completely automated public Turing test to tell computers and humans apart). A content server may receive a request from a user device to access content or a service by the content server. In response the request, the content server may require authentication of the user device through an authentication server. The user device may be granted access to the content or service upon a successfully authentication of a CAPTCHA response.

15 Claims, 7 Drawing Sheets

CAPTCHA AUTHENTICATION USING SMART WATCH SCRIBBLE

TECHNICAL FIELD

A method and system for authenticating a user device through a CAPTCHA challenge and CAPTCHA response.

SUMMARY

In one aspect, the present disclosure provides a method for authenticating user access to a first service, the method comprising: transmitting, by a first user device, an authentication request to access the first service; receiving, by the first user device, a CAPTCHA challenge based on the authentication request; displaying, by the first user device, the CAPTCHA challenge on a first user interface; displaying, by a second user device, an input prompt on a second user interface to enter a CAPTCHA response to the CAPTCHA challenge displayed on the first user interface, wherein the second user interface is restricted to freehand user inputs to create the CAPTCHA response; receiving, by the first user device, the CAPTCHA response from the second user device; transmitting, by the first user device, the CAPTCHA response to an authentication server; and receiving, by the first user device, an authentication status of the CAPTCHA response by the authentication server.

In another aspect, the present disclosure provides a system for authenticating access for a user device, the system comprising: an authentication server; a first user device; a second user device; the first user device is communicably coupled to the second user device, wherein the first user device is configured to: transmit an authentication request to access a first service; receive a CAPTCHA challenge based on the authentication request; display the CAPTCHA challenge on a first user interface of the first user device, display an input prompt on a second user interface of the second user device to enter a CAPTCHA response to CAPTCHA challenge displayed on the first user interface, and wherein the second user interface is restricted to freehand user inputs to create the CAPTCHA response; receive the CAPTCHA response from the second user device; transmit the CAPTCHA response to the authentication server; and receive an authentication status of the CAPTCHA response by the authentication server.

In yet another aspect, the present disclosure provides a method for authenticating user access to a first service, the method comprising: transmitting, by a user device, a service request to access the first service; receiving, by the user device, a CAPTCHA challenge based on the service request; displaying, by the user device, an input prompt on an input interface for a user input; restricting, by the user device, the user input on the input interface to a predetermined input medium; receiving, by the user device, the user input through the predetermined input medium of the input interface; converting, by the user device, the user input to a CAPTCHA response, wherein the CAPTCHA response is in a different data format from the user input; transmitting, by the user device, the CAPTCHA response to an authentication server; and receiving, by the user device, an authentication status of the CAPTCHA response by the authentication server.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
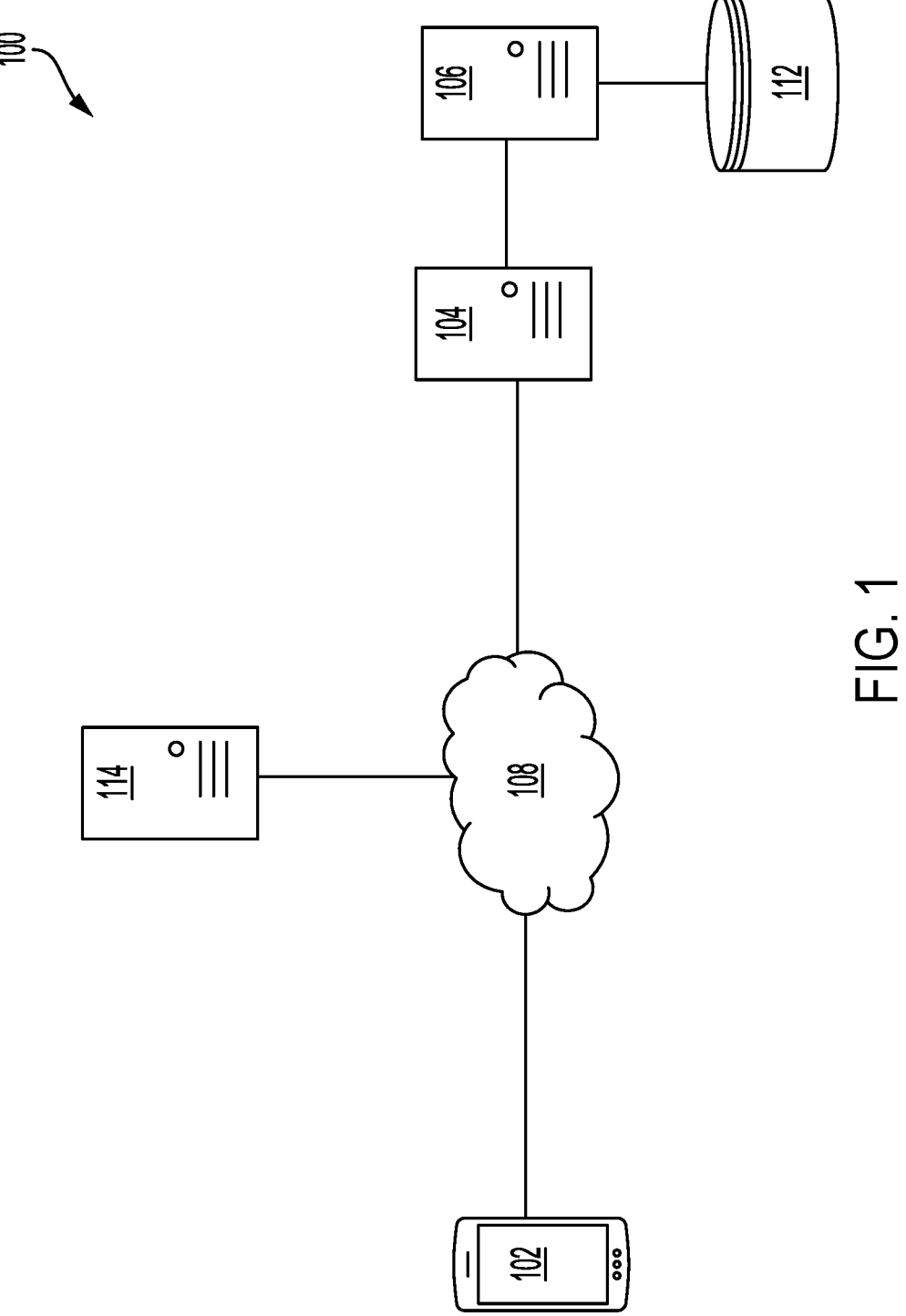

The systems and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 shows a device authentication system comprising a user device, wide area network, an authentication server, service or content server, a CAPTCHA server, and a storage repository, according to at least one aspect of the present disclosure.

Figure 2:
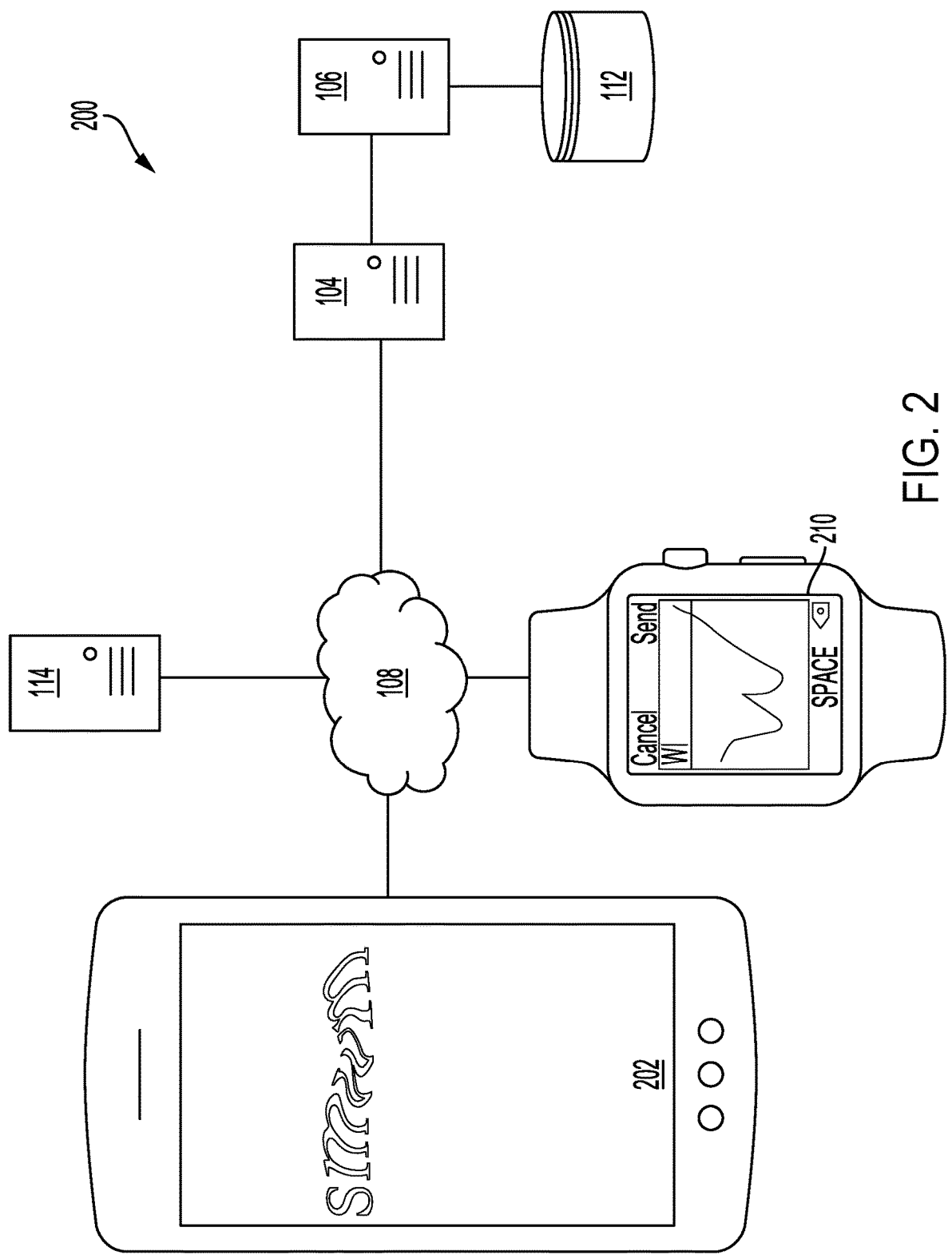

FIG. 2 shows a device authentication system comprising a first user device, a second user device, a communication network (e.g., wide area network), an authentication server, a CAPTCHA server, and a storage repository, according to at least one aspect of the present disclosure.

Figure 3:
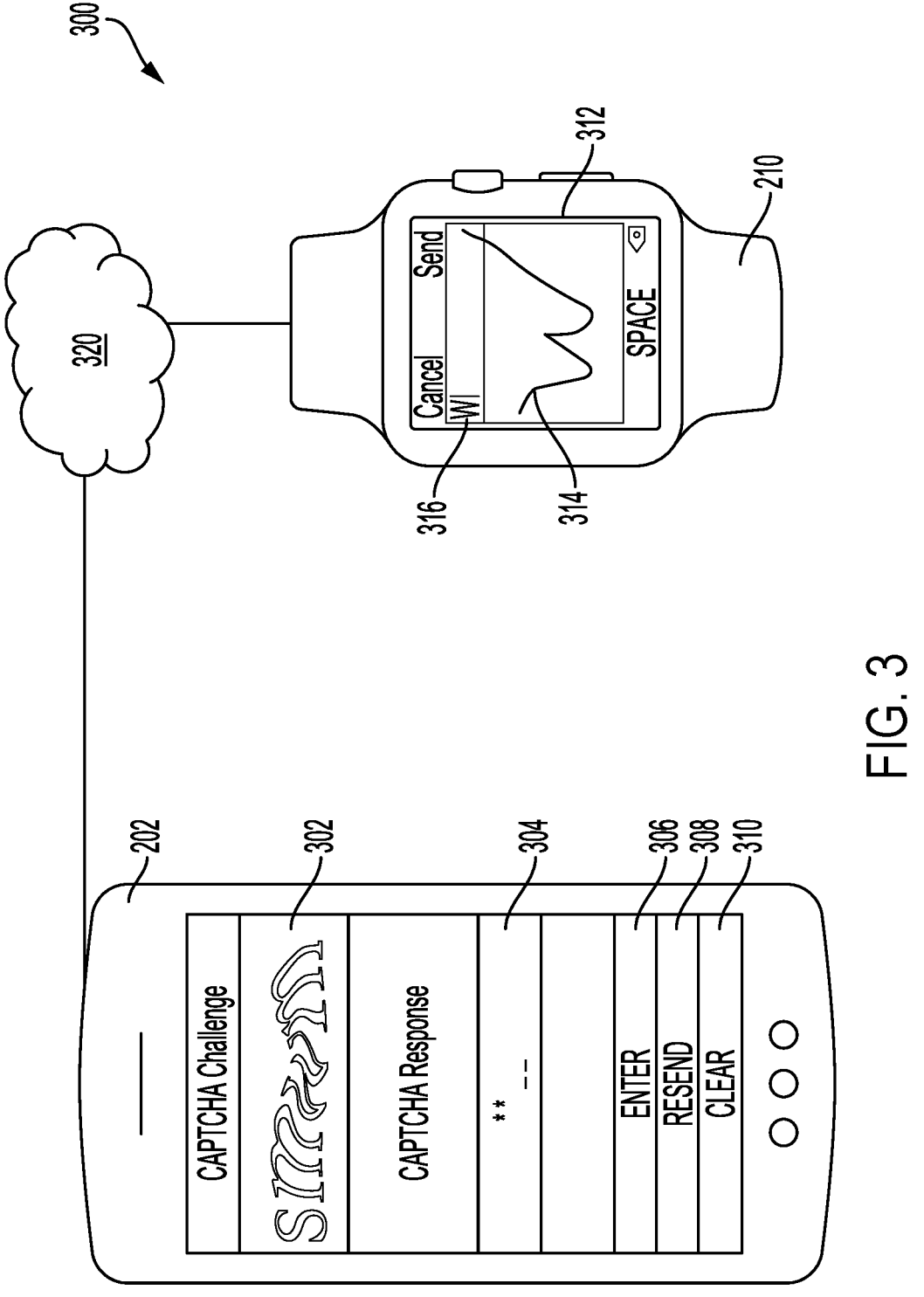

FIG. 3 shows a communication system comprising a first user device and a second user device, communicably coupled through a wireless communication protocol, during the authentication of the first user device, according to at least one aspect of the present disclosure.

Figure 4:
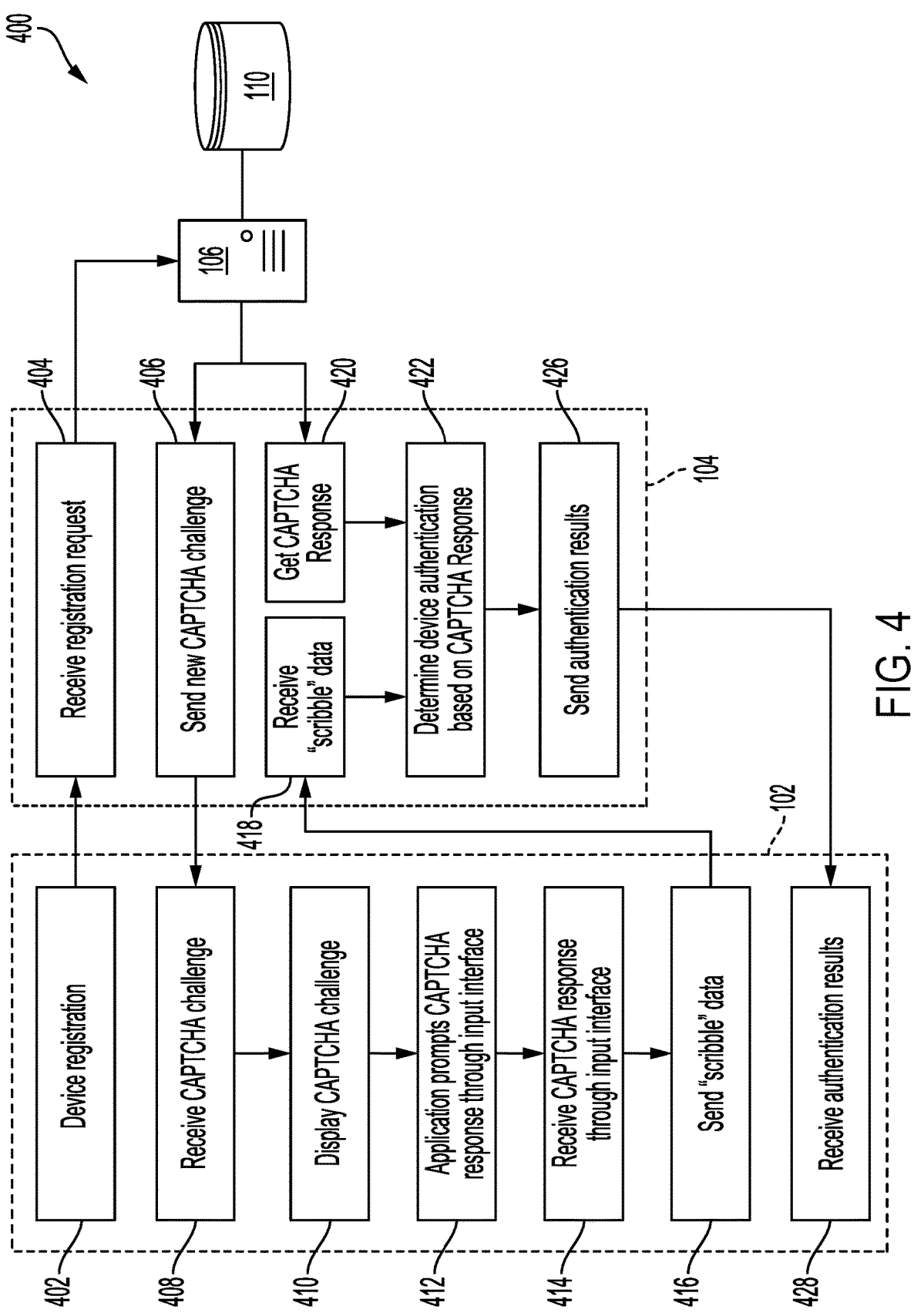

FIG. 4 shows a logic flow diagram for a method of authenticating a user device through a CAPTCHA challenge, according to at least one aspect of the present disclosure.

Figure 5:
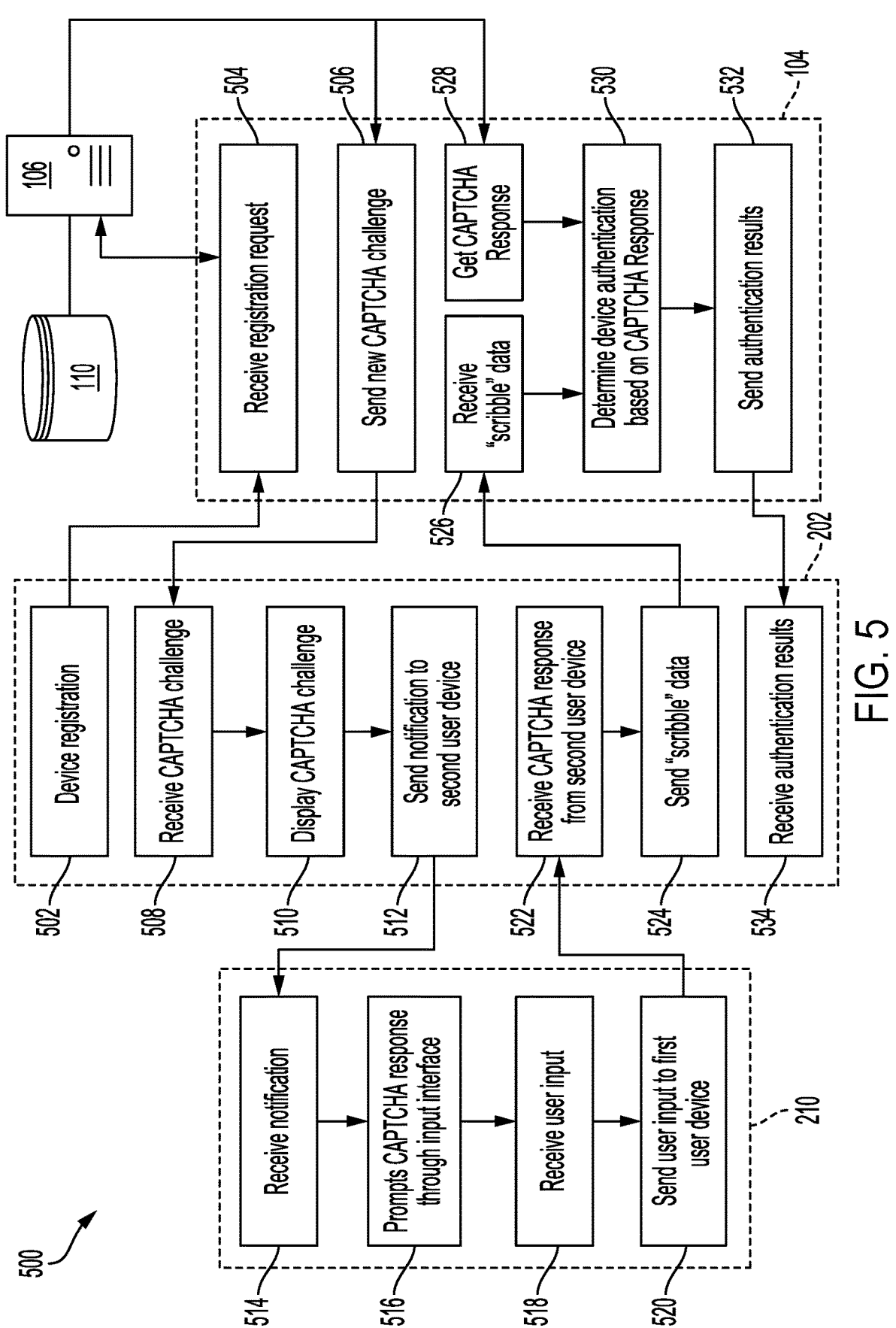

FIG. 5 shows a logic flow diagram for a method of authenticating a first user device through a CAPTCHA challenge with a second user device, according to at least one aspect of the present disclosure.

Figure 6:
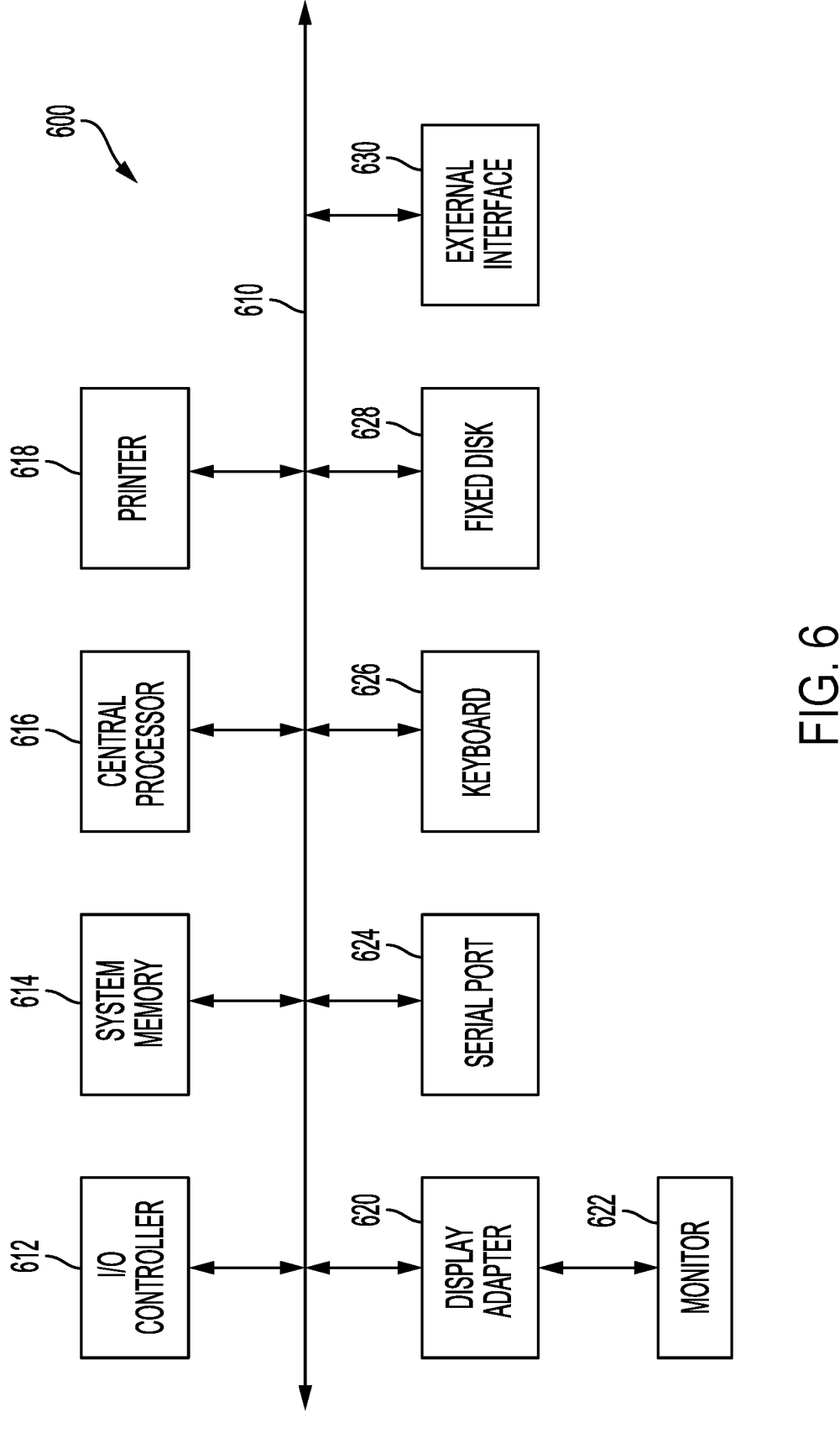

FIG. 6 is a block diagram of a computer apparatus with data processing subsystems or components, according to at least one aspect of the present disclosure.

Figure 7:
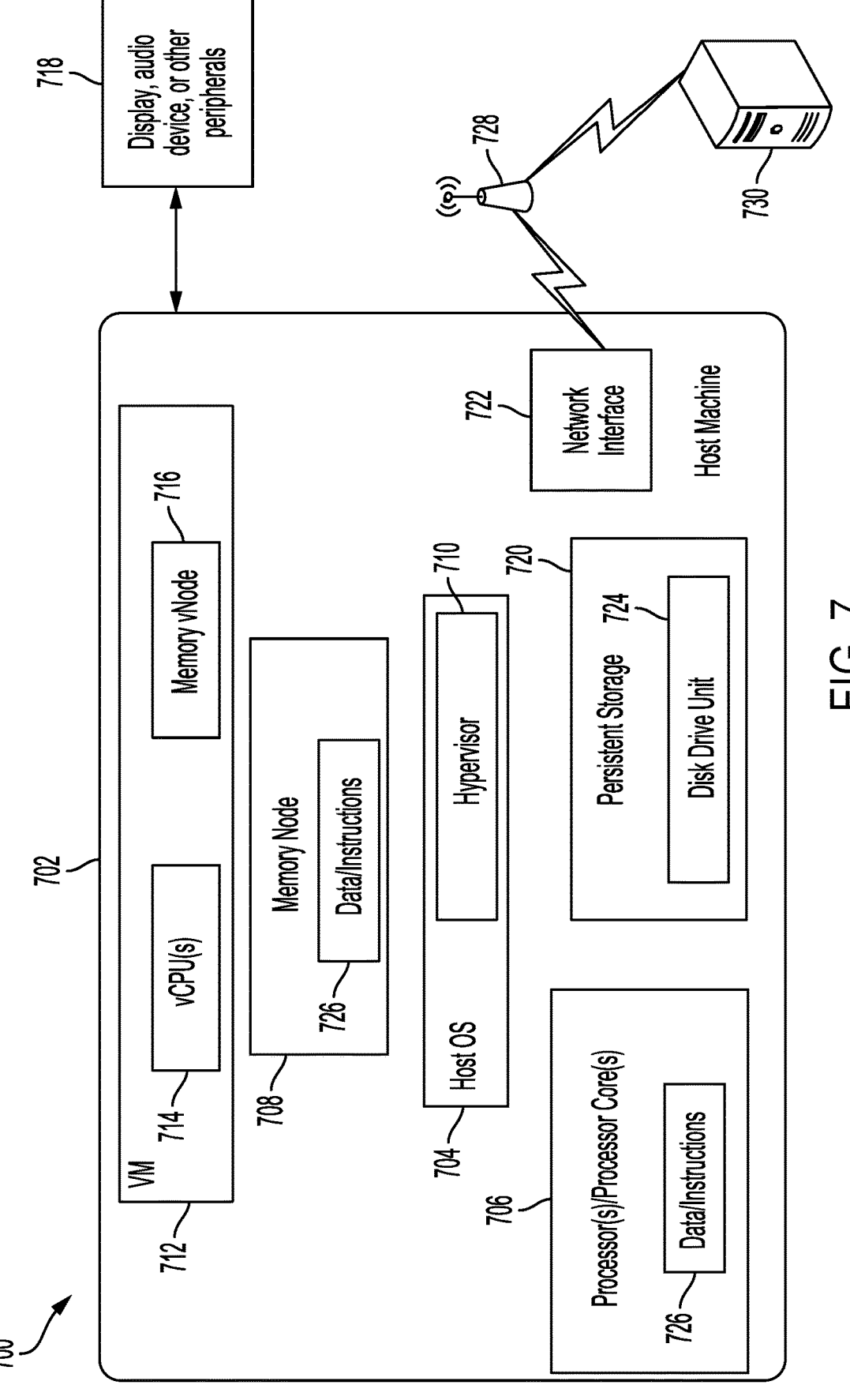

FIG. 7 is a diagrammatic representation of an example system that includes a host machine within which a set of instructions to perform any one or more of the methodologies discussed herein may be executed, according to at least one aspect of the present disclosure.

DESCRIPTION

The following disclosure may provide exemplary systems, devices, and methods for conducting a financial transaction and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

An "agent" may be an entity appointed by an application to perform specific functions on behalf of the application.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction.

An "application program interface" (API) refers to computer code or other data sorted on a computer-readable medium that may be executed by a processor to facilitate the interaction between software components, such as a client-side front-end and/or server-side back-end for receiving data from the client.

An "interface" refers to a generated display, such as one or more graphical user interfaces (GUIs) with which a user may interact, either directly or indirectly (e.g., through a keyboard, mouse, touchscreen, etc.).

"Authentication" is a process by which the credential of an endpoint (including but not limited to applications, people, devices, process, and systems) can be verified to ensure that the endpoint is who they are declared to be.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection that may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

A "server computer" may be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer, or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support payment network cloud service.

As used herein, "short range communication" or "short range wireless communication" may comprise any method of providing short-range contact or contactless communications capability, such as RFID, Bluetooth™, infra-red, or other data transfer capability that can be used to exchange data between a payment device and an access device. In some embodiments or aspects, short range communications may be in conformance with a standardized protocol or data transfer mechanism (e.g., ISO 14443/NFC). Short range communication typically comprises communications at a range of less than 2 meters. In some embodiments or aspects, it may be preferable to limit the range of short range communications (e.g., to a range of less than 1 meter, less than 10 centimeters, or less than 2.54 centimeters) for security, technical, and/or practical considerations. For instance, it may not be desirable for a point of sale (POS) terminal to communicate with every payment device that is within a 2 meter radius because each of those payment devices may not be involved in a transaction, or such communication may interfere with a current transaction involving different financial transaction devices. Typically the payment device or the access device also includes a protocol for determining resolution of collisions (e.g., when two payment devices are communicating with the access device simultaneously). The use of short range communications may be used when the merchant and the consumer are in close geographic proximity, such as when the consumer is at the merchant's place of business.

A "user" may include an individual. In some embodiments or aspects, a user may be associated with one or more personal accounts and/or mobile devices. The user may also be referred to as a cardholder, account holder, or consumer.

A "user device" is an electronic device that may be transported and/or operated by a user. A user device may provide remote communication capabilities to a network. The user device may be configured to transmit and receive data or communications to and from other devices. In some embodiments or aspects, the user device may be portable. Examples of user devices may include mobile phones (e.g., smart phones, cellular phones, etc.), PDAs, portable media players, wearable electronic devices (e.g., smart watches, fitness bands, ankle bracelets, rings, earrings), electronic reader devices, and portable computing devices (e.g., laptops, netbooks, ultrabooks). Examples of user devices may also include automobiles with remote communication capabilities.

In various aspects, the present disclosure describes a system for authenticating a user device with a CAPTCHA (completely automated public Turing test to tell computers and humans apart). A content server may receive a request from a user device to access content or a service through an application on the user device. In response to the request, the content server may require the authentication of the user device through an authentication server. The user device may be granted access to the content or service upon a successful authentication of a CAPTCHA response, determined by the authentication server.

CAPTCHAs are designed to differentiate human behavior from "bots" that execute automated commands with scripts to perform spam account registration, data scraping, and disseminate unsolicited spam promotions. Content servers and service providers often use CAPTCHAs to prevent bots from gaining unauthorized access to service data and reducing network bandwidth that negatively affects the quality of service or content for an authentic client device. However, the increased sophistication of machine learning poises an increased threat to the ability to differentiate humans and bots.

Accordingly, the present disclosure describes a method and system for improving CAPTCHA challenges by requiring a CAPTCHA response to be entered through a freehand writing application, such as a scribble application or freehand user interface, for example. The freehand writing application allows a user to draw the characters corresponding to the CAPTCHA challenge without a keyboard.

FIG. 1 shows a device authentication system 100 comprising a user device 102, communication network 108 (e.g., wide area network), an authentication server 104, service provider or content server 114, a CAPTCHA server 106, and a storage repository 112, according to at least one aspect of the present disclosure. In various aspects, the user device 102 comprises an application, such as a front-end user interface that provides access to content or services of the content server 114. In response to an access request of the content or services, of the content server 114, the application on the user device 102 may be prompted to register the user device 102 with an authentication server 104. Additionally, the CAPTCHA server 106 may generate the CAPTCHA challenge and a corresponding CAPTCHA response this is used to authenticate a user CAPTCHA response. The CAPTCHA server 106 may store the CAPTCHA challenge and corresponding CAPTCHA response as a key pair in the storage repository 112.

In various aspects, the application may be configured with additional security features to make traditional CAPTCHA challenges more difficult to bypass by non-human bots. In various aspects, the application may restrict the input user interface for the CAPTCHA response to a freehand user input interface (e.g., scribble application) that receives a freehand user input through a user's finger or stylus on a touch screen. The user draws the equivalent characters on a touch screen with their finger or stylus; the freehand application identifies the equivalent ASCII character if any, and converts the freehand input to the ASCII character. Additionally, the user may be restricted from entering a response through a keyboard interface (e.g., screen, physical keyboard). The freehand user input interface may be part of the application itself or may be configured by the application to access a freehand input application on the device.

FIG. 2 shows a device authentication system 200 comprising a first user device 202, a second user device 210, a communication network 108 (e.g., wide area network), an authentication server 104, a CAPTCHA server 106, and a storage repository 112, according to at least one aspect of the present disclosure. During an initial setup of an application, the application may require that a second user device 210 is registered with the application and communicably couplable to the first user device 202. During the authentication of the first user device 202, the second user device 210 is communicably coupled to the first user device 202. The first user device 202 and the second user device 210 may be wirelessly connected through a local area network, communication network 108 (e.g., wide area network), or directly communicate through a device-to-device wireless communication protocol (e.g., short-range wireless communication protocol, Bluetooth, NFC, machine-to-machine communication protocol, etc.).

FIG. 3 shows a communication system 300 comprising a first user device 202 and a second user device 210, communicably coupled through a wireless communication protocol 320, during the authentication of the first user device 202, according to at least one aspect of the present disclosure. The first user device 202 receives a CAPTCHA challenge 302 from the authentication server 104 and sends a notification to the second user device 210. In various aspects, the application on the first user device may communicate with an agent on the second user device 210 to restrict the input user interface for the CAPTCHA response, to a freehand user input interface (e.g., scribble application) 312 on the second user device 210. The freehand input user interface 312 receives a freehand input 314 through a freehand writing motion of the user's finger or stylus on a touch screen and identifies an equivalent ASCII character, and converts the freehand input to the ASCII character.

In this aspect, the first user device 202 is unable to provide an input in the CAPTCHA response field 304, and the CAPTCHA response field 304 is automatically populated with the user input of the second user device 210. The user input from the second user device 210 may be displayed in the CAPTCHA response field 304 of the first user device 202 as anonymous characters or plain test. The user input on the second user device 210 may be automatically sent to the first user device 202 after each character is entered on the second user device 210 or all characters may be sent together to the first user device 202. If the user selects the clear button 310, the CAPTCHA response field 304 is erased and the second user device 210 is prompted to reenter a response to the CAPTCHA challenge 302 that is displayed on the first user device 202. If the user selects the resend button 308, which triggers a request for a new CAPTCHA challenge, the first user device 202 receives a new CAPTCHA challenge 302 and displays it in the first user interface of the first user device 202. The CAPTCHA response field 304 is then erased, and the second user device 210 is prompted to enter a response to the new CAPTCHA challenge displayed on the first user device 202.

FIG. 4 shows a logic flow diagram for a method of authenticating a user device 102 through a CAPTCHA challenge, according to at least one aspect of the present disclosure. The application on the user device 102 initiates 402 a device registration with an authentication server 104 by sending a registration request to the authentication server 104. The authentication server 104 receives 404 the registration request, and requests a new CAPTCHA challenge from the CAPTCHA server 106. The CAPTCHA server 106 comprises a storage repository 112 with the CAPTCHA challenge and the correct CAPTCHA response. The authentication server 104 receives the new CAPTCHA challenge from the CAPTCHA server 106 and sends 406 the CAPTCHA challenge to the user device 102. The user device 102 receives 408 the CAPTCHA challenge and displays 410 the CAPTCHA challenge on the user device 102. The application automatically prompts 412 the user of the user device 102 to input the CAPTCHA response through a freehand user input interface (e.g., scribble application interface). The application receives the CAPTCHA response from the freehand user input interface and sends 416 the scribble data to the authentication server 104. The authentication server 104 receives 418 the scribble data from the user device 102, as an attempt to authenticate the user device 102 with a user CAPTCHA response. The authentication server 104 requests and receives 420 the correct CAPTCHA response from the CAPTCHA server 106. The CAPTCHA server 106 accesses the storage repository 112 to retrieve the correct CAPTCHA response corresponding to the CAPTCHA challenge. The authentication server 104 compares 422 the user CAPTCHA response (e.g., scribble data) to the correct CAPTCHA response to determine an authentication status of the user device 102. The authentication server 104 sends 426 the authentication status to the user device 102 and the user device 102 receives 428 the authentication status. The application on the user device 102 may use the authentication results to access the content server 114.

FIG. 5 shows a logic flow diagram for a method of authenticating a first user device 202 through a CAPTCHA challenge with a second user device 210, according to at least one aspect of the present disclosure. The application on the first user device 202 initiates 502 a device registration with an authentication server 104 by sending a registration request to the authentication server 104. The authentication server 104 receives 504 the registration request and requests a new CAPTCHA challenge from the CAPTCHA server 106. The CAPTCHA server 106 comprises a storage repository 112 with the CAPTCHA challenge and the correct CAPTCHA response. The authentication server 104 receives the CAPTCHA challenge from the CAPTCHA server 106 and sends 506 the CAPTCHA challenge to the first user device 202. The first user device 202 receives 508 the CAPTCHA challenge and displays 510 the CAPTCHA challenge on the first user device 202. The application on the first user device sends 512 a notification to the second user device 210. The notification may be an auditory, physical, and/or visual alert on the second user device 210. The second user device 210 receives 514 the notification and automatically prompts 516 the user of the second user device 210 to input the CAPTCHA response through the freehand input user interface 312. In one example, the second user device 210 (e.g., smart watch) vibrates, the touch screen is activated by transitioning from a blank screen to an illuminated interface, and second user device 210 displays a freehand input user interface 312 that prompts the user to enter the CAPTCHA response to the CAPTCHA challenge displayed on the first user device 202.

The freehand input user interface 312 receives 518 the user input and sends 520 the user input to the first user device 202. The first user device 202 receives 522 the user input from the second user device 210 and displays the user input as the CAPTCHA response in the application of first user device 202. The first user device sends 524 the scribble data (e.g., user CAPTCHA response) to the authentication server 104. The authentication server 104 receives 526 the scribble data from the first user device 202. The authentication server 104 requests and receives 528 the correct CAPTCHA response from the CAPTCHA server 106. The authentication server 104 compares 530 the user CAPTCHA response to the correct CAPTCHA response, to determine an authentication status of the first user device 202. The authentication server 104 send 532 the authentication status to the first user device 202 and the first user device 202 receives 534 the authentication status. The application of the first user device 202 may use the authentication results to access the content server 114.

FIG. 6 is a block diagram of a computer apparatus 600 with data processing subsystems or components, according to at least one aspect of the present disclosure. The methods and systems of FIGS. 1-5 may be executed by the computer apparatus 600. The subsystems shown in FIG. 6 are interconnected via a system bus 610. Additional subsystems such as a printer 618, keyboard 626, fixed disk 628 (or other memory comprising computer-readable media), monitor 622, which is coupled to a display adapter 620, and others are shown. Peripherals and input/output (I/O) devices, which couple to an I/O controller 612 (which can be a processor or other suitable controller), can be connected to the computer system by any number of means known in the art, such as a serial port 624. For example, the serial port 624 or external interface 630 can be used to connect the computer apparatus to a wide area network such as the Internet, a mouse input device, or a scanner. The interconnection via system bus allows the central processor 616 to communicate with each subsystem and to control the execution of instructions from system memory 614 or the fixed disk 628, as well as the exchange of information between subsystems. The system memory 614 and/or the fixed disk 628 may embody a computer-readable medium.

FIG. 7 is a diagrammatic representation of an example system 700 that includes a host machine 702 within which a set of instructions to perform any one or more of the methodologies discussed herein may be executed, according to at least one aspect of the present disclosure. In various aspects, the host machine 702 operates as a standalone device or may be connected (e.g., networked) to other machines. In a networked deployment, the host machine 702 may operate in the capacity of a server or a client machine in a server-client network environment, or as a peer machine in a peer-to-peer (or distributed) network environment. The host machine 602 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 700 includes the host machine 702, running a host operating system (OS) 704 on a processor or multiple processor(s)/processor core(s) 706 (e.g., a central processing unit (CPU), a graphics processing unit (GPU), or both), and various memory nodes 708. The host OS 704 may include a hypervisor 710 which is able to control the functions and/or communicate with a virtual machine ("VM") 712 running on machine readable media. The VM 712 also may include a virtual CPU or vCPU 714. The memory nodes 708 may be linked or pinned to virtual memory nodes or vNodes 716. When the memory node 708 is linked or pinned to a corresponding vNode 716, then data may be mapped directly from the memory nodes 708 to their corresponding vNodes 716.

All the various components shown in host machine 702 may be connected with and to each other, or communicate to each other via a bus (not shown) or via other coupling or communication channels or mechanisms. The host machine 702 may further include a video display, audio device or other peripherals 718 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker) a persistent storage device 720 (also referred to as disk drive unit), and a network interface device 722. The host machine 702 may further include a data encryption module (not shown) to encrypt data. The components provided in the host machine 702 are those typically found in computer systems that may be suitable for use with aspects of the present disclosure and are intended to represent a broad category of such computer components that are known in the art. Thus, the system 700 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 724 also may be a Solid-state Drive (SSD), a hard disk drive (HDD) or other includes a computer or machine-readable medium on which is stored one or more sets of instructions and data structures (e.g., data/instructions 726) embodying or utilizing any one or more of the methodologies or functions described herein. The data/instructions 726 also may reside, completely or at least partially, within the main memory node 708 and/or within the processor(s) 706 during execution thereof by the host machine 702. The data/instructions 726 may further be transmitted or received over a network 728 via the network interface device 722 utilizing any one of several well-known transfer protocols (e.g., Hyper Text Transfer Protocol (HTTP)).

The processor(s) 706 and memory nodes 708 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 702 and that causes the host machine 702 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 730 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 702, with each server 730 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

Clause 1. A method for authenticating user access to a first service, the method comprising: transmitting, by a first user device, an authentication request to access the first service; receiving, by the first user device, a CAPTCHA challenge based on the authentication request; displaying, by the first user device, the CAPTCHA challenge on a first user interface; displaying, by a second user device, an input prompt on a second user interface to enter a CAPTCHA response to the CAPTCHA challenge displayed on the first user interface, wherein the second user interface is restricted to freehand user inputs to create the CAPTCHA response; receiving, by the first user device, the CAPTCHA response from the second user device; transmitting, by the first user device, the CAPTCHA response to an authentication server; and receiving, by the first user device, an authentication status of the CAPTCHA response by the authentication server.

Clause 2. The method of Clause 1, wherein the first user device and the second user device are communicably coupled though a direct device-to-device communication protocol.

Clause 3. The method of Clauses 1-2, further comprising: receiving, by the second user device, a notification from the first user device, wherein the notification activates a touch screen of the second user device and displays the second user interface to enter the CAPTCHA response.

Clause 4. The method of Clauses 13, further comprising: receiving, by the second user device, a freehand user input in the second user interface; identifying, by the second user device, an ASCII character corresponding to the freehand user input; and transmitting, by the second user device, the ASCII character to the first user device.

Clause 5. The method of Clauses 1-4, further comprising: automatically sending, by the second user device, individual characters to the first user device, and wherein the individual characters populate a CAPTCHA response field displayed in the first user interface of the first user device.

Clause 6. The method of Clause 5, wherein the individual characters cannot be inputted into the CAPTCHA response field from the first user interface of the first user device.

Clause 7. The method of Clause 5, further comprising: receiving, by the first user device, a user selection of a first button on the first user interface; and transmitting, by the first user device, the individual characters displayed in the CAPTCHA response field to the authentication server as the CAPTCHA response.

Clause 8. The method of Clause 5, further comprising: receiving, by the first user device, a user selection of a second button on the first user interface; deleting, by the first user device, the individual characters displayed in the CAPTCHA response field of the first user interface; and sending, by the first user device, a notification to the second user device, wherein the notification prompts a user to re-enter the individual characters of the CAPTCHA response.

Clause 9. The method of Clause 5, further comprising: receiving, by the first user device, a user selection of a third button on the first user interface; transmitting, by the first user device, a request to the authentication server for a new CAPTCHA challenge; deleting, by the first user device, the individual characters displayed in the CAPTCHA response field of the first user interface; receiving, by the first user device, the new CAPTCHA challenge; and sending, by the first user device, a notification to the second user device, wherein the notification prompts a user to enter the individual characters of a new CAPTCHA response.

Clause 10. A system for authenticating access for a user device, the system comprising: an authentication server; a first user device; a second user device; the first user device is communicably coupled to the second user device, wherein the first user device is configured to: transmit an authentication request to access a first service; receive a CAPTCHA challenge based on the authentication request; display the CAPTCHA challenge on a first user interface of the first user device, display an input prompt on a second user interface of the second user device to enter a CAPTCHA response to CAPTCHA challenge displayed on the first user interface, and wherein the second user interface is restricted to freehand user inputs to create the CAPTCHA response; receive the CAPTCHA response from the second user device; transmit the CAPTCHA response to the authentication server; and receive an authentication status of the CAPTCHA response by the authentication server.

Clause 11. The system of Clause 10, wherein the first user device and the second user device are communicably coupled though a direct device-to-device communication protocol.

Clause 12. The system of Clauses 10-11, wherein the second user device is configured to: receive a notification from the first user device, wherein the notification activates a touch screen of the second user device and displays the second user interface to enter the CAPTCHA response.

Clause 13. The system of Clauses 10-12, wherein the second user device is configured to: receive a freehand user input in the second user interface; identify an ASCII character corresponding to the freehand user input; and transmit the ASCII character to the first user device.

Clause 14. The system of Clauses 10-13, wherein the second user device is configured to: automatically sends individual characters to the first user device, and wherein the individual characters populate a CAPTCHA response field displayed in the first user interface of the first user device.

Clause 15. The system of Clause 14, wherein the individual characters cannot be inputted into the CAPTCHA response field from the first user interface of the first user device.

Clause 16. A method for authenticating user access to a first service, the method comprising: transmitting, by a user device, a service request to access the first service; receiving, by the user device, a CAPTCHA challenge based on the service request; displaying, by the user device, an input prompt on an input interface for a user input; restricting, by the user device, the user input on the input interface to a predetermined input medium; receiving, by the user device, the user input through the predetermined input medium of the input interface; converting, by the user device, the user input to a CAPTCHA response, wherein the CAPTCHA response is in a different data format from the user input; transmitting, by the user device, the CAPTCHA response to an authentication server; and receiving, by the user device, an authentication status of the CAPTCHA response by the authentication server.

Clause 17. The method of Clause 16, wherein the predetermined input medium is not a keyboard or keyboard interface.

Clause 18. The method of Clauses 16-17, wherein the user device comprises a first user device and a second user device, and wherein the first user device and second user device are communicably coupled though a direct device-to-device communication protocol.

Clause 19. The method of Clause 18, further comprising: receiving, by the second user device, a notification from the first user device, wherein the notification activates a touch screen of the second user device and displays a second user interface on the second user device to enter the CAPTCHA response.

Clause 20. The method of Clause 18, further comprising: automatically sending, by the second user device, individual characters to the first user device, and wherein the individual characters populate a CAPTCHA response field displayed on the first user device.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer-readable medium, such as RAM, ROM, a magnetic medium such as a hard-drive or a floppy disk, or an optical medium such as a CD-ROM. Any such computer-readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer-readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method for authenticating user access to a first service, the method comprising:

transmitting, by a first user device, an authentication request to access the first service, wherein the first user device is registered with the first service;

receiving, by the first user device, a CAPTCHA challenge based on the authentication request;

displaying, by the first user device, the CAPTCHA challenge on a first user interface;

communicating, by the first user device, a restriction to a second user device to restrict entry of CAPTCHA response characters to freehand user inputs on a second user interface of the second user device;

displaying, by the second user device, an input prompt on the second user interface to enter a CAPTCHA response to the CAPTCHA challenge displayed on the first user interface, wherein second user device is registered with the first service;

receiving, by the first user device, individual characters corresponding to the freehand user inputs of the CAPTCHA response from the second user device;

transmitting, by the first user device, the CAPTCHA response to an authentication server; and receiving, by the first user device, an authentication status of the CAPTCHA response by the authentication server.

2. The method of claim 1, wherein the first user device and the second user device are communicably coupled though a direct device-to-device communication protocol.

3. The method of claim 1, further comprising: receiving, by the second user device, a notification from the first user device, wherein the notification activates a touch screen of the second user device and displays the second user interface to enter the CAPTCHA response.

4. The method of claim 1, further comprising:

receiving, by the second user device, a freehand user input in the second user interface;

identifying, by the second user device, an ASCII character corresponding to the freehand user input; and transmitting, by the second user device, the ASCII character to the first user device.

5. The method of claim 1, further comprising: automatically sending, by the second user device, individual characters to the first user device, and wherein the individual characters populate a CAPTCHA response field displayed in the first user interface of the first user device.

6. The method of claim 5, wherein the individual characters cannot be inputted into the CAPTCHA response field from the first user interface of the first user device.

7. The method of claim 5, further comprising:

receiving, by the first user device, a user selection of a first button on the first user interface; and transmitting, by the first user device, the individual characters displayed in the CAPTCHA response field to the authentication server as the CAPTCHA response.

8. The method of claim 5, further comprising:

receiving, by the first user device, a user selection of a second button on the first user interface;

deleting, by the first user device, the individual characters displayed in the CAPTCHA response field of the first user interface; and sending, by the first user device, a notification to the second user device, wherein the notification prompts a user to re-enter the individual characters of the CAPTCHA response.

9. The method of claim 5, further comprising:

receiving, by the first user device, a user selection of a third button on the first user interface;

transmitting, by the first user device, a request to the authentication server for a new CAPTCHA challenge;

deleting, by the first user device, the individual characters displayed in the CAPTCHA response field of the first user interface;

receiving, by the first user device, the new CAPTCHA challenge; and sending, by the first user device, a notification to the second user device, wherein the notification prompts a user to enter the individual characters of a new CAPTCHA response.

10. A system for authenticating access for a user device, the system comprising:

an authentication server;

a first user device registered with an application or service;

a second user device registered with the application or service;

the first user device is communicably coupled to the second user device, wherein the first user device is configured to:

transmit an authentication request to access the application or service;

receive a CAPTCHA challenge based on the authentication request;

display the CAPTCHA challenge on a first user interface of the first user device, display an input prompt on a second user interface of the second user device to enter a CAPTCHA response to CAPTCHA challenge displayed on the first user interface, and communicate a restriction to a second user device to restrict entry of CAPTCHA response characters to freehand user inputs on a second user interface;

receive individual characters corresponding to the freehand user inputs of the CAPTCHA response from the second user device;

transmit the CAPTCHA response to the authentication server; and receive an authentication status of the CAPTCHA response by the authentication server.

11. The system of claim 10, wherein the first user device and the second user device are communicably coupled though a direct device-to-device communication protocol.

12. The system of claim 10, wherein the second user device is configured to: receive a notification from the first user device, wherein the notification activates a touch screen of the second user device and displays the second user interface to enter the CAPTCHA response.

13. The system of claim 10, wherein the second user device is configured to:

receive a freehand user input in the second user interface;

identify an ASCII character corresponding to the freehand user input; and transmit the ASCII character to the first user device.

14. The system of claim 10, wherein the second user device is configured to: automatically send individual characters to the first user device, and wherein the individual characters populate a CAPTCHA response field displayed in the first user interface of the first user device.

15. The system of claim 14, wherein the individual characters cannot be inputted into the CAPTCHA response field from the first user interface of the first user device.

* * * * *